(12) United States Patent
Hodge

(10) Patent No.: US 6,715,141 B1
(45) Date of Patent: Mar. 30, 2004

(54) MULTIPHASE SINGLE PASS INTERPRETER

(76) Inventor: Bruce Hodge, 54 Wilton Rd., Greenfield, NY (US) 12833

(*) Notice: Subject to any disclaimer, the term of this patent is extended or adjusted under 35 U.S.C. 154(b) by 390 days.

(21) Appl. No.: 09/594,297

(22) Filed: Jun. 15, 2000

(51) Int. Cl.[7] ................................................. G06F 9/45
(52) U.S. Cl. ........................ 717/139; 717/142; 717/143
(58) Field of Search ........................... 717/139, 140–143

(56) References Cited

U.S. PATENT DOCUMENTS

| | | | |
|---|---|---|---|
| 4,905,138 A | | 2/1990 | Bourne |
| 5,657,438 A | | 8/1997 | Wygodny et al. |
| 6,065,024 A | * | 5/2000 | Renshaw ..................... 707/513 |
| 6,106,571 A | | 8/2000 | Maxwell |
| 6,112,237 A | | 8/2000 | Donaldson et al. |
| 6,188,400 B1 | * | 2/2001 | House et al. ................ 345/805 |
| 6,292,936 B1 | * | 9/2001 | Wang .......................... 717/115 |
| 6,311,325 B1 | * | 10/2001 | Levine et al. ................ 717/128 |
| 6,336,213 B1 | * | 1/2002 | Beadle et al. ................ 717/136 |
| 6,353,925 B1 | * | 3/2002 | Stata et al. .................. 717/112 |
| 6,470,349 B1 | * | 10/2002 | Heninger et al. ............ 707/102 |

OTHER PUBLICATIONS

Aho, Alfred V., Sethi, Ravi, Ullman, Jeffrey D., "Compilers Principles, Techniques, and Tools", 1986, Addison–Wesley, p. 10.*

Boussinot, Frederic and Hazard, Laurent, "Reactive Scripts", p. 270–277, 1996 IEEE, retrieved from the IEEE database Dec. 5, 2002.*

Gosling, James and McGilton, Henry, "The Java Language Environment, A White Paper", May 1996, retrieved from http://java.sun.com/docs/white/langenv/index on Dec. 5, 2002.*

Mittra, Swapnajit, "VIP: A Verilog Interpreter for Preprocessing", 1996 IEEE, retrieved from the IEEE database Dec. 5, 2002.*

"PowerDynamo(TM) User's Guide, Part II, Reference, Chapter 9. The DynaScript Language", retrieved by Google search, Dec. 5, 2002. Http://www.ems.com.cn/Site/doc/00000068.*

"Chapter 2 The DynaScript Language", 1999 Sybase, retrieved by a Google search Dec. 5, 2002, http://ok/seo-kang.ac.kr/onestop/doc/dynamoref/pdreferencep8.*

* cited by examiner

Primary Examiner—Tuan Dam
Assistant Examiner—Mary Steelman
(74) Attorney, Agent, or Firm—Baker & McKenzie (57) ABSTRACT

A multiphase single pass interpreter switches modes of execution. The interpreter scans a program file in a scan phase until a tag signaling the presence of a script language is encountered. The interpreter then switches its mode to full parse phase where each line scanned is tokenized and parsed. Tokens are replaced with their dynamic content, if any. When the interpreter detects logic blocks, the interpreter changes its mode to p-code generation phase and generates p-code for the lines of code within the logic block. The generated p-code is then executed by the interpreter in its p-code execution phase. The interpretation is performed in a single pass through the program file.

15 Claims, 6 Drawing Sheets

```
http://www.hodgepodge.com/dal/dynascript_dynamic_variable_synth.dal?
Title=DynaScript+Dynamic+variable+synthesis+with+automatic+late+binding <-(Interpreter is in Initialization phase)—— 301
<html> <-(Interpreter is in scan phase)
                                                                        ← 300
<head>
<title>URL!Title</title> ~— 303
</head>                                     ⎫
                                            ⎬ 302
<body bgcolor="#FFFFFF">                    ⎪
                                            ⎪
<center>                                    ⎪
<table border="1">                          ⎭

308 —<% <-(Interpreter is now in full parse phase)
       /* DynaScript!Dynamic object synthesis with automatic late binding
          (c) 2000 HodgePodge Software, Inc

*/
       conn!conn.connect("Client");        ⎫
       var!cmd = "select * from ClientList" ; ⎬ 304
     ⎧ if (!exists(URL!LastName)) <-(Interpreter is now in p-code generation phase)
306 ⎨   { var!cmd += " where LastName = '" +URL!LastName+ "'" ;}<-(Interpreter is now in p-code execution phase)
     ⎩ cursor!cursor = conn!conn.prepare(var!cmd);<-(Interpreter is now in full parse phase) ⎫ 307
       cursor!cursor.execute();                                                              ⎭
       %> <-(Interpreter is now in scan phase)

<tr><th colspan="3" bgcolor="#FFFF00"> Client List </th></tr>                    ⎫ 312
       <tr><th> First Name </th><th> Last Name </th><th> Phone Number </th></tr>        ⎭

<% <-(Interpreter is now in full parse phase)—— 314
    ⎧ while (fetch())<-(Interpreter is now in p-code generation phase)
316 ⎨  { print("<tr><td> %s </td><td> %s </td><td> %s </td></tr>\n", SQL!FirstName, SQL!LastName, SQL!PhoneNumber) ;}
       <-(Interpreter is now in p-code execution phase)
       <-(interpreter is now in full parse phase)
          // The 3 SQL! objects above were dynamically synthesized and automatically binded to
          // Notice that the names of each object matches each respective column name in the table
       %> <-(Interpreter is now in scan phase)—— 318

</table>  ⎫
       </center> ⎬ 320
       </body>   ⎭
</html><-(Interpreter is now in termination phase) —— 322
```

FIG. 4

```
<% /* DynaScript® Loop Example
       (c) 2000 HodgePodge Software, Inc
    */
var@cnt = 0;

while(var@cnt < 6)
{ var@cnt++;
  print(" cnt = %d\n" ,var@cnt);
}

%>
```
⎫
⎬ 402
⎭

Output:
Cnt = 1
Cnt = 2
Cnt = 3    } 404
Cnt = 4
Cnt = 5

The input list sequence that the DynaScript Executor sees:
```
var@cnt = 0;
var@cnt++;
print("cnt=%d\n",var@cnt);
var@cnt++;
print("cnt=%d\n",var@cnt);
var@cnt++;                    } 406
print("cnt=%d\n",var@cnt);
var@cnt++;
print("cnt=%d\n",var@cnt);
var@cnt++;
print("cnt=%d\n",var@cnt);
```

| PCode for Loop Example ||| 
|---|---|---|
| Index | PCode | Comment |
| 0 | If not var@cnt <6 Jump index 4 | This conditional jump is only executed by P-Code executor |
| 1 | var@cnt++; | This is the first input string that the DynaScript executor sees |
| 2 | print("cnt = %d\n",var@cnt); | This is the last input string that the DynaScript executor sees |
| 3 | Jump 0 | This unconditional jump is only executed by P-Code executor and forces the index counter back to zero |
| 4 | PCode End Marker | This marker causes the P-Code executor to halt and switches the input back to fetching out of the source buffer instead of the P-Code execution list |

| SYMBOL TABLE EXAMPLE | | | |
|---|---|---|---|
| SYMBOL | TYPE | LENGTH | VALUE |
| URL@Title | String | 66 | DynaScript Dynamic variable synthesis with automatic late binding |
| VAR@Cmd | String | 25 | select* from ClientList |
| SQL@FirstName | String | 50 | Bruce |
| SQL@LastName | String | 50 | Hodge |
| SQL@PhoneNumber | String | 20 | 518-555-1212 |

FIG. 6

| PCode EXAMPLE | |
|---|---|
| INDEX | PCode |
| 0 | If not exists URL@LastName Jump index 2 |
| 1 | var@cmd += "where LastName='"+URL@LastName+"'" |
| 2 | PCode End Marker |

FIG. 7

ClientList TABLE CONTENTS — 702

| FirstName | LastName | PhoneNumber |
|---|---|---|
| Bruce | Hodge | 555-1212 |
| Barbara | Hodge | 555-1111 |
| John | Doe | 555-2222 |

FIG. 8

MULTIPHASE SINGLE PASS INTERPRETER

TECHNICAL FIELD OF THE INVENTION

The present invention relates generally to computer programming language interpreter and particularly, to system and method for multiphase single pass interpreter.

BACKGROUND OF THE INVENTION

An interpreter typically carries out a series of commands in a program or a script one command at a time by requesting services from an operating system. In general, script languages which are interpreted by interpreters are easier and faster to code than the more structured and compiled languages such as C. The script, however, takes longer time to execute than a compiled program because each instruction requires interpretation before the basic machine instruction processing can begin.

Particularly, most interpreters use the two pass method of interpreting. On the first pass, the existing interpreters convert the entire program or code into a simplistic microcode that performs conditional and unconditional jumps. The micro-code is generally known as p-code. On the second pass, these prior art interpreters execute the precompiled p-code. Therefore, it is highly desirable to have an interpreter that would maintain all the advantages of the interpreter but at the same time reduce the long run-time duration that is typically associated existing prior art program interpreters.

SUMMARY OF THE INVENTION

The present invention is directed to a scripting language interpreter that changes its mode of execution in a single pass as lines of code are read and interpreted. The interpreter of the present invention scans a program file while in scan phase, also referred hereinafter as a linear mode, parsing and writing out what is scanned. Also in the scan phase, if the interpreter encounters dynamic variables that need to be resolved, the interpreter resolves them with their corresponding literal content. When a predetermined symbol that signals the beginning of a script is encountered, for example, a DynaScript® start tag, the interpreter changes its mode of execution to full parse phase. In full parse phase, the interpreter tokenizes and parses lines of code in their entirety, executing the lines of code as they are parsed. The interpreter remains in full parse phase until a script stop token is detected. Upon detecting the script stop token, the interpreter switches its mode back to the scan phase.

While in full parse phase, the interpreter of the present invention may switch its mode to a p-code generation and execution phase. The p-code generation and execution phase is activated when the interpreter detects an existence of a conditional logic block while operating in the full parse phase. In p-code generation phase, the interpreter generates lines of p-code associated with the conditional logic block. After the conditional logic block is translated into lines of p-code, the interpreter switches its mode to p-code execution phase, wherein the interpreter executes the generated p-code. The generated p-code is executed using macro instructions that include basic conditional and unconditional jumps or branching instructions. After the interpreter completes processing the conditional logic block, the interpreter switches its mode back to the full parse phase and continues its processing according to the method described hereinabove with reference to the full parse phase.

The interpreter remains in full parse phase until a script stop token is detected. Upon detecting the script stop token, the interpreter switches its mode back to the scan phase and continues its processing according to the method described hereinabove with reference to the scan phase. When an end of file or end of source buffer is detected the interpreter enters the termination phase. Briefly, DynaScript® is an interpreter implementing an object type declaration syntax prefix and is described in greater detail in co-pending U.S. patent application Ser. No. 09/583,672 entitled OBJECT TYPE-DECLARATION PREFIX SYNTAX, filed on May 31, 2000.

The interpreter of the present invention includes a lexan or lexical analyzer that analyzes each character and generates tokens based on the characters analyzed. A parser performs semantic validation to determine if the generated tokens are semantically correct. A p-code generator generates the p-code based on the parsed tokens. Each p-code generated is inserted into a p-code execution list The generated p-code is then executed by resetting the pointer to the beginning of the p-code execution list and executing the p-code one line at a time. In scan phase the scanner scans the lines of script and replaces DynaScript variables with their corresponding dynamic content. This novel interpreting technique is significantly faster to run and uses less memory.

Further features and advantages of the present invention as well as the structure and operation of various embodiments of the present invention are described in detail below with reference to the accompanying drawings. In the drawings, like reference numbers indicate identical or functionally similar elements.

BRIEF DESCRIPTION OF THE DRAWINGS

Preferred embodiments of the present invention will now be described, by way of example only, with reference to the accompanying drawings in which:

FIG. 3 illustrates an example of a code listing which may be interpreted with the multiphase single pass interpreter of the present invention;

DETAILED DESCRIPTION OF INVENTION

The present invention is related to co-pending U.S. patent application Ser. No. 09/583,672 entitled OBJECT TYPE-DECLARATION PREFIX SYNTAX, filed on May 31, 2000, and co-pending U.S. patent application Ser. No. 09/583,673 entitled DYNAMIC OBJECT SYNTHESIS WITH AUTOMATIC LATE BINDING, filed on May 31, 2000, the disclosures of which are incorporated herein in their entirety by reference thereto.

Figure 1:
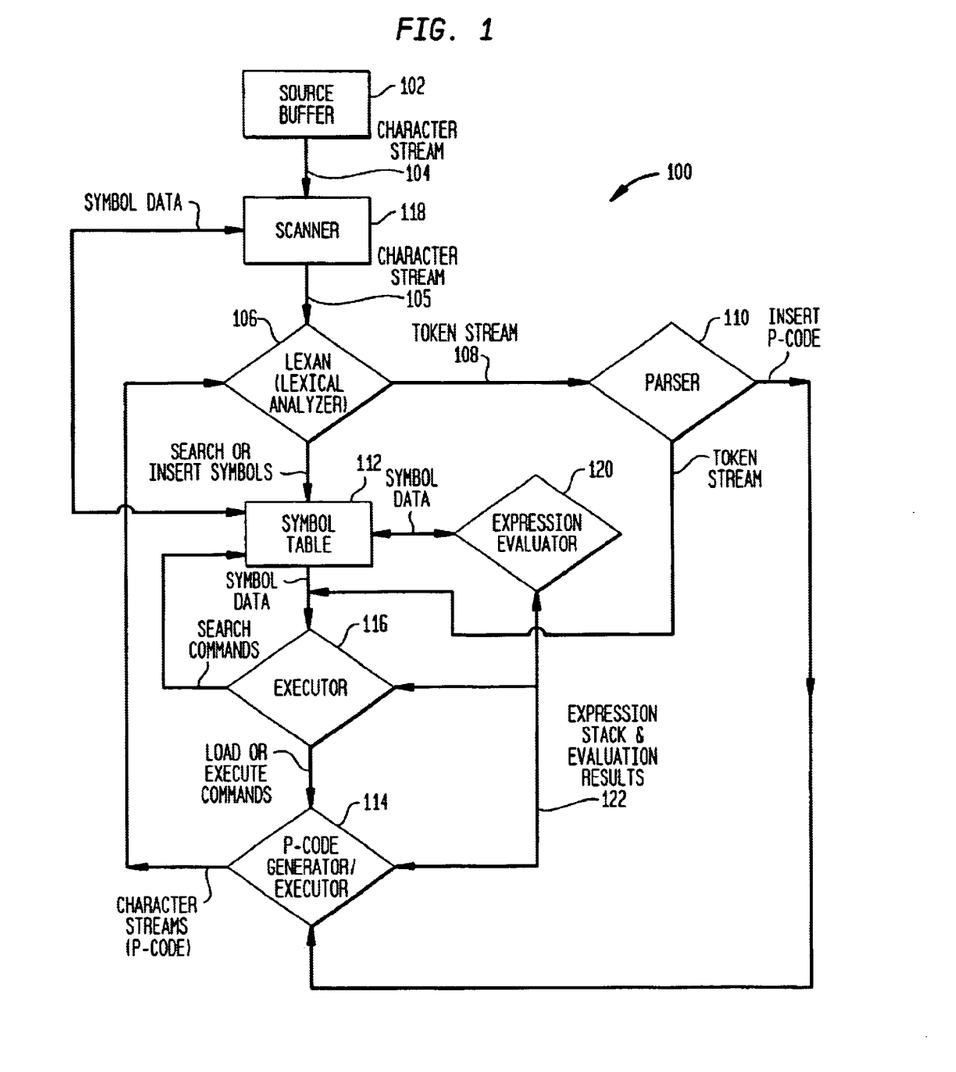
FIG. 1 is a logic diagram illustrating the components of the interpreter of the present invention in one embodiment.

FIG. 1 is a block diagram 100 illustrating the components of the interpreter of the present invention in one embodiment. The interpreter of the present invention processes the source code in a single pass by changing phases depending on the data it is processing. It is a data driven interpreter. As shown in FIG. 1, the source code is read into a source buffer 102. A scanner 118 scans a line in the source buffer 102, for example, as character streams 104, searching for a symbolic variable, i.e., DynaScript® object. When a symbolic variable is found, the scanner dynamically evaluates and replaces the symbolic name with its corresponding literal content. For example, an object name "URL@Title" occurring in a line of code may be evaluated by the scanner to a title that was embedded in the URL of the web page. This information may be obtained from a symbol table 112.

Once the script start tag has been detected, the scanned line or a stream of characters 105 is passed to a lexical analyzer 106. Lexan, the lexical analyzer 106 receives a character stream 105 and generates a token stream 108. The methods by which a lexical analyzer tokenizes a character stream are known to those skilled in the art and also may be found in Writing Compiler and Interpreters by Ronald Mak, 2d Ed., John Wiley & Sons, 1996. Lexan 106 may also insert the token stream 108 into the symbol table.

Briefly, tokens represent a single character or grouping of characters that are recognized by a parser 110. The parser 110 receives the token stream 108. From the parser 110, the token stream may be sent to the executor 116 to be executed immediately or to be generated into lines of p-code by the p-code generator/executor 114 depending on the type of the token stream received. The executor 116 of the present invention executes statements in the token stream by initiating system resource function calls associated with the statements. Examples of system resource function call include ODBC function calls. When the token stream includes an expression that may need to be evaluated, the token stream is passed to the executor 116 who builds an expression stack 122 and passes the expression stack 122 to the expression evaluator 120. The expression evaluator 120 evaluates the expression and returns the result back. The expression evaluator 120 also may insert the evaluated expressions, e.g., name/value pair into the symbol table 112. Both the executor 116 and the p-code generator/executor 114 may use the services of expression evaluator 120 to have expressions evaluated and returned.

The interpreter in one embodiment includes initialization phase, scan phase, full parse phase, p-code generation phase, p-code execution phase, and termination phase. When the interpreter starts, the interpreter is in initialization phase. In this phase, the interpreter initializes and instantiates objects used by the interpreter. Also, in this phase, the symbol table is propagated with symbolic names and their corresponding literal expressions and attributes which are known to the system at the time of initialization. As the interpreter's processing progresses, the symbol table 112 is updated with new information. For example, URL variables or name/value pairs are decoded and inserted into the symbol table.

When the initialization is complete, the interpreter enters scan phase. The interpreter remains in the scan phase until a script start tag, e.g., a DynaScript® start tag, is detected or an end of file is found. Also in this phase, all lines are scanned for DynaScript® objects by the scanner. As described hereinabove, DynaScript® objects, or symbolic names, are replaced with their dynamic content. All output, including the evaluated expressions is directly sent to the standard output, e.g., STDOUT stream.

When a script start tag, e.g., a DynaScript® start tag is detected, the interpreter changes its mode to full parse phase.

In this mode, the lexan 102 and the parser 110 fully process and parse each line in its entirety. The parsed commands are executed immediately unless they are wrapped in a control logic block. A control logic block includes, for example, lines within IF THEN ELSE conditional block or within loops such as the FOR, WHILE or DO loops. When control logic block is detected, the interpreter changes its mode to yet another phase, i.e., a p-code generation phase.

In p-code generation phase, the p-code generator 114 converts the lines of code that occur within a logic block into p-code. The generated p-code is stored in a p-code execution list with a corresponding micro-code index for each line of p-code generated. The micro-code index typically begins with the number zero. Branching instructions typically are padded with place holders for branching addresses until the entire conditional logic block is processed. When all the code within a logic block are generated into p-code, the interpreter then inserts a p-code end marker in the p-code execution list. The place holder are replaced with their corresponding jump indices. An example of a p-code execution list generated by the p-code generator of the present invention shown in FIG. 6 and FIG. 4 at 407. Referring back to FIG. 1, after generating the p-code, the interpreter changes its mode to p-code execution phase.

In p-code execution phase, a micro-code index counter is set to zero for the interpreter to begin executing the p-code at the beginning of the list. The p-code is executed until a p-code end marker is encountered. In one embodiment of the present invention, the p-code is fetched by the executor 116, tokenized, parsed, and executed. In this embodiment, p-code generator/executor performs the branching instructions in the p-code and communicates to the executor 116 what commands to fetch and execute. Thus, p-code generator/executor acts as a source buffer emulator. In this way, the executor 116 need not know whether it is executing a line from the p-code execution list or a source buffer. After executing all the p-code in the p-code execution list, the interpreter changes its mode back to the full parse phase and continues processing according to the method described hereinabove. In this phase, the executor 116 fetches the character stream from the source buffer and not the p-code executor 114. When a script stop tag, e.g., DynaScript® end token, is detected or read, the interpreter changes its mode back to the scan phase, and continues processing lines of code.

When an end of file is detected, the interpreter changes its mode into a termination phase in which the interpreter frees the allocated resources and terminates its processing. Within one file, the interpreter may switch its mode as many times as needed, according to the type of data encountered in that file. For example, to continue the example above, after having changed its mode to scan phase, the interpreter may again switch to a full parse phase if the interpreter detects another script start token.

Figure 5:
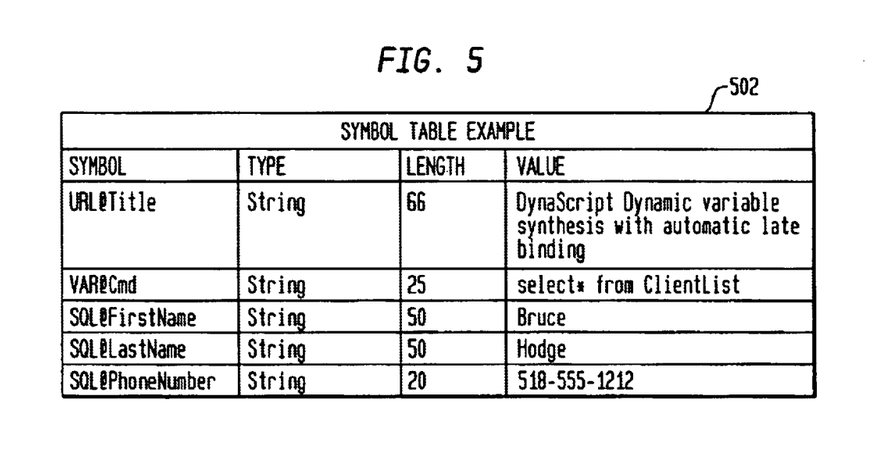
FIG. 5 illustrates an example of a symbol table created by the interpreter of the present invention.
Figure 6:
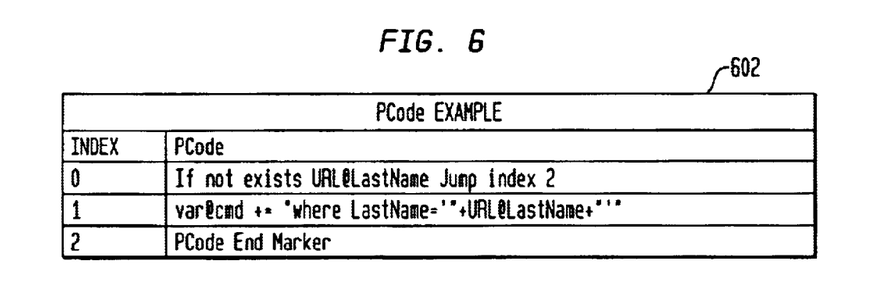
FIG. 6 illustrates a p-code execution list generated by the p-code generator of the present invention.

FIG. 5 illustrates an example of a symbol table 502 created by the interpreter of the present invention. As illustrated, the symbol table includes name/value pairs as well as other information associated with a symbol. FIG. 6 illustrates a p-code execution list 602 generated by the p-code generator 114 of the present invention. As shown, p-code instructions include unconditional or conditional jumps to corresponding indices.

Figure 2:
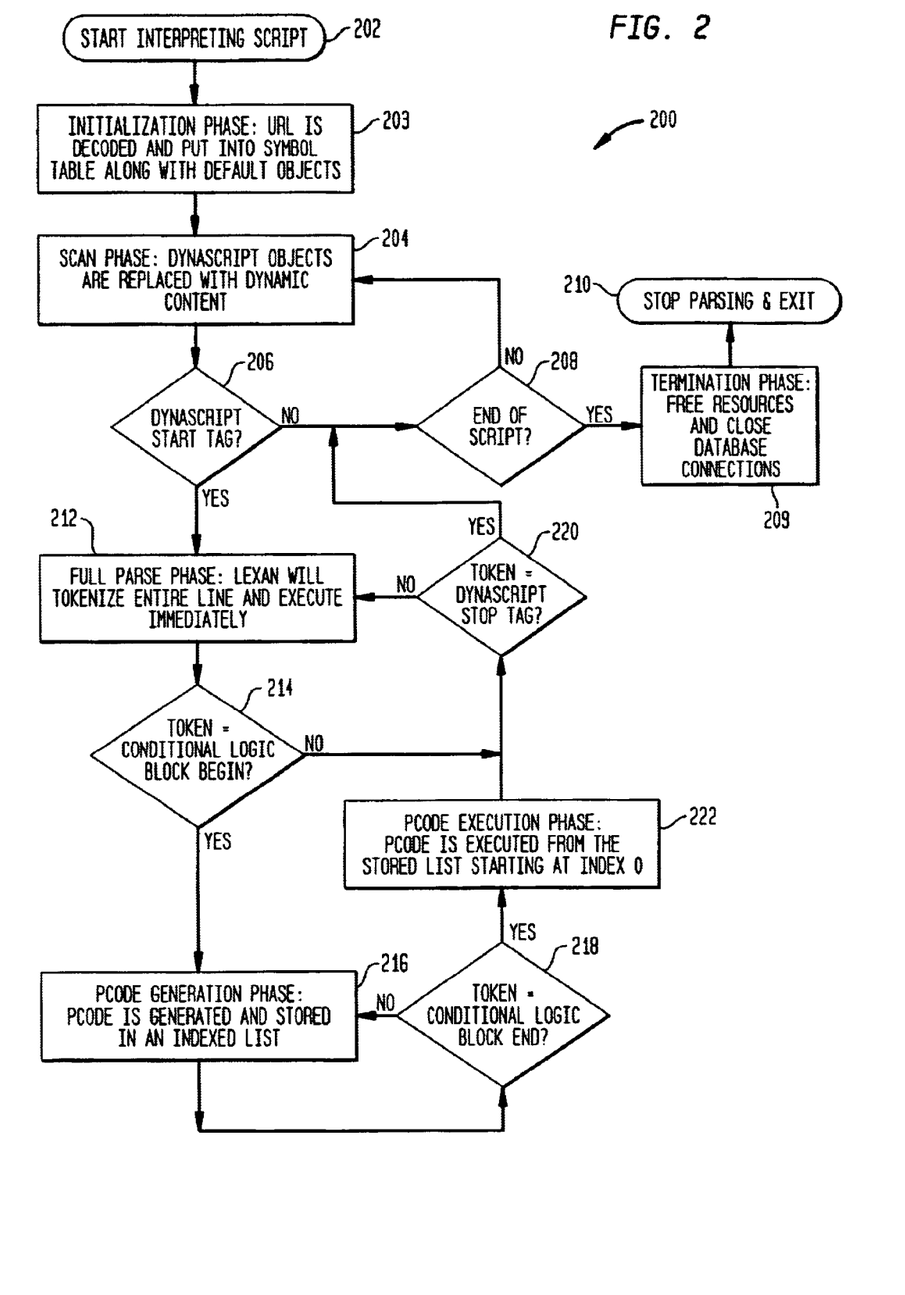
FIG. 2 is a high-level flow diagram illustrating the method of the present invention in one embodiment.

FIG. 2 is a high-level flow diagram 200 illustrating the method of the present invention in one embodiment. At step 202, the interpreter begins. At step 203, the interpreter is In initialization phase where default objects are instantiated and symbolic variables or name/value pairs, e.g., from URL, are decoded and written into the symbol table. At step 204, the interpreter is initially in scan phase. In scan phase, the scanner component of the interpreter looks for a script object or symbol such as a DynaScript object, for example, "TypeDeclaration@ObjectName". If a script object such as a DynaScript is found, the interpreter replaces the object with its dynamic content. For instance, If an object name scanned is URL@loginid, the interpreter replaces the object with the dynamic content of the loginid. As another example, if an object name scanned is ENV@HTTP_HOST, the Interpreter replaces the object of this environment variable, e.g., with www.dynascript.com.

At step 206, if a script start tag is detected, the processing continues to step 212. If an end of file is detected at step 208, the interpreter enters its termination phase 209 and terminates at step 210 after freeing all allocated memory and closing all open database connections. At step 208, if it is determined that there is no end of file detected, the processing continues back at step 204.

At step 206, if a script start tag is detected signifying a start of a scripting language, e.g., DynaScript®, the interpreter switches its mode to full parse phase. At step 212, the lexical analyzer or lexan, now in full parse phase, tokenizes the entire line scanned, executing statements immediately as each line is parsed. At step 214, if the token scanned includes a conditional logic block, the interpreter changes its mode to p-code generation phase. If no conditional logic block is detected at step 214, the interpreter determines at step 220, whether the scanned token is a script stop tag representing end of the script. If the token is a script stop tag, then the interpreter continues processing to step 208 where it is determined whether an end of file is detected. If end of file is not detected, the interpreter returns to scan phase at step 204.

At step 214, if the scanned token includes a conditional logic block, the interpreter changes its mode to p-code generation phase and at step 216 begins to generate p-code for each line within the conditional block. Each line of p-code is stored in an indexed list referred to as p-code execution list. At step 218, when a token signifying the end of the conditional block is detected, the interpreter changes its mode to p-code execution phase at step 222. If the token does not represent the end of the conditional block at step 218, the interpreter continues to generate and store at step 216, p-code corresponding to the scanned lines.

At step 222, the interpreter enters the p-code execution phase and executes the p-code in the p-code execution list starting at index zero. When the interpreter completes executing the generated p-code, the interpreter returns to its full parse phase and continues its processing at step 220.

FIG. 3 illustrates an example of a code listing 300 which may be interpreted with the multiphase single pass interpreter of the present invention. After its initialization phase 301, the interpreter starts scanning a file in scan phase. For example, when the interpreter scans the code at 302. When the interpreter sees the "URL@Title" token 303 the interpreter replaces that title with the title specified in the Uniform Resource Locator (URL) of the web page being called. As described hereinabove, this information has been inserted into the symbol table 112 during the initialization phase. The replaced stream of characters having the actual title is then written out to STDOUT stream.

When the interpreter detects a script start tag, e.g., <% 308, the interpreter changes its mode to full parse phase. The interpreter tokenizes and parses the statements at 304 immediately, assigning, e.g., the token "var@cmd", with its dynamic content "select*from ClientList". As soon as the statements are tokenized and parsed, the interpreter executes the statements. When the interpreter detects a control logic block 306, e.g., IF statement, the interpreter switches its mode to p-code generation phase and execution phase, generating and executing p-code for the block 306. After processing the conditional logic block at 306, the interpreter switches its mode to P-Code execution phase then full parse phase and continues processing the statements at 307 in full parse phase by having the executor execute the statements as described hereinabove with reference to full parse phase.

When the interpreter detects a script stop token, e.g., %>310, the interpreter switches to the scan phase. The interpreter scans the lines at 312 and sends the scanned lines to a standard output file, e.g., stdout. At 314, the interpreter changes is mode to full parse phase upon detecting the start tag, e.g., <% symbol. When the interpreter scans the while loop at 316, the interpreter enters the p-code generation and execution phases, to generate and execute p-code associated with the lines of code within the while loop 316. Then the interpreter changes its mode back to the full parse phase and upon detecting the script stop token at 318, e.g., %>symbol, the interpreter changes its mode to the scan phase. The statements at 320 are scanned and when the interpreter detects an end of file, in this example right after "</html>" 322, the interpreter enters termination phase and terminates releasing all resources.

Figure 7:
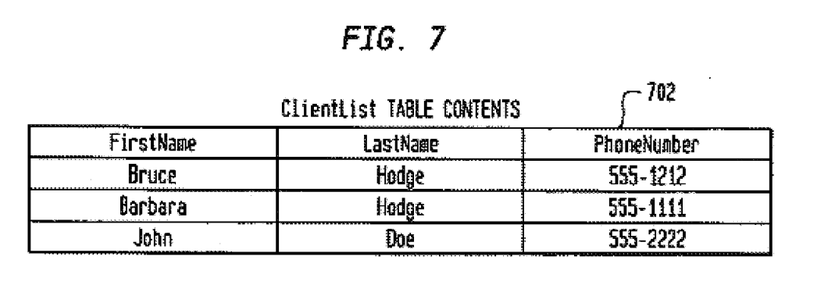
FIG. 7 illustrates a text output that is generated by the scripting code example of FIG. 3.
Figure 8:
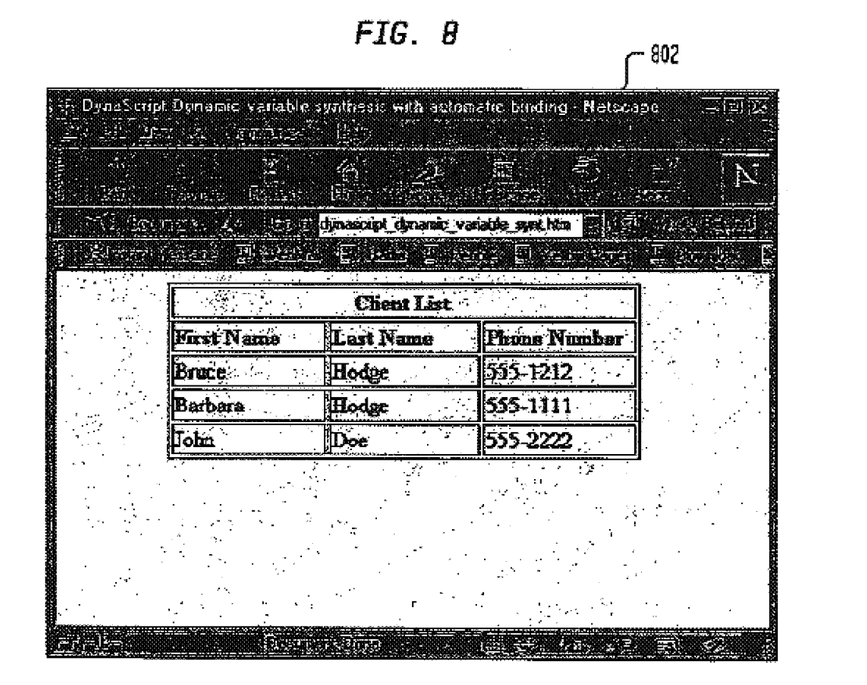
FIG. 8 illustrates a web page output that is generated by the scripting code example of FIG. 3.

FIG. 7 illustrates the contents of the database "ClientList" table 702 used by the scripting code example of FIG. 3. FIG. 8 illustrates a web page output 802 that is generated by the scripting code example of FIG. 3.

Figure 4:
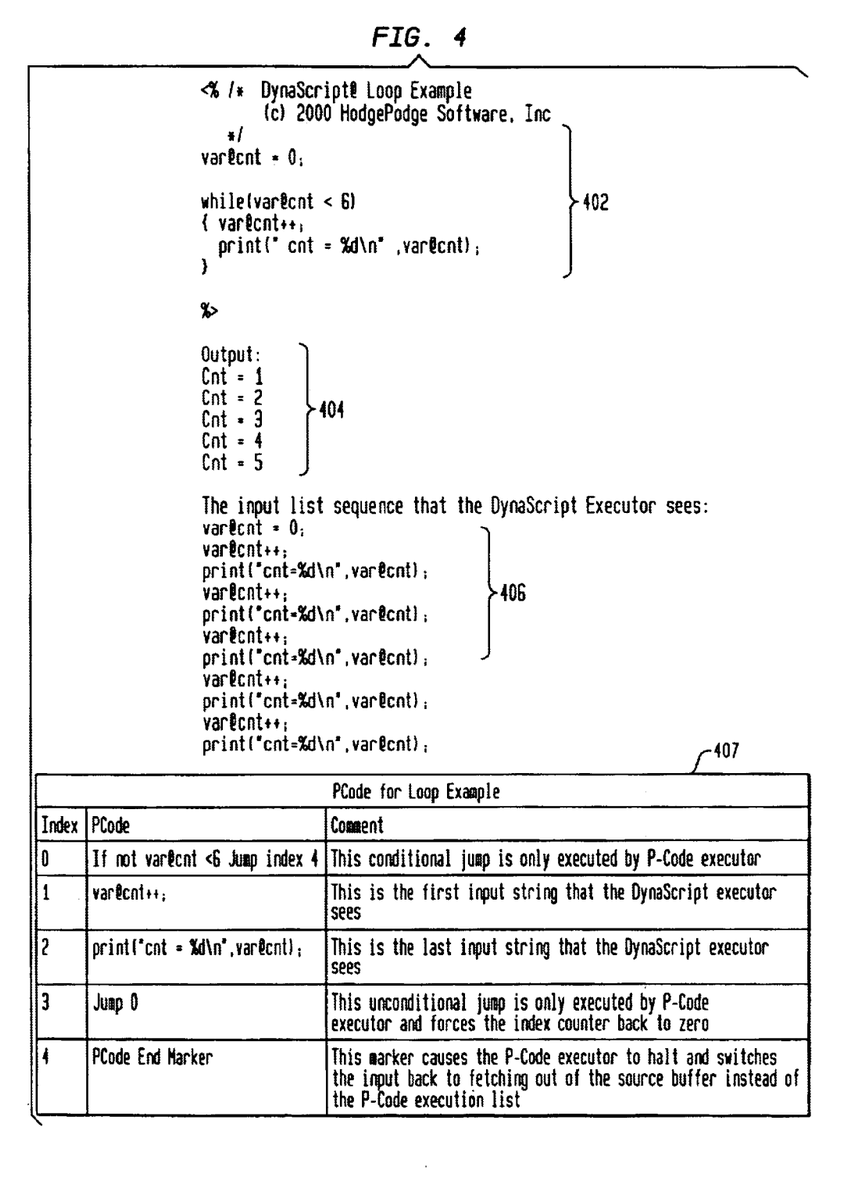
FIG. 4 illustrates another example of a script and corresponding p-code that is generated by the interpreter of the present invention.

FIG. 4 illustrates another example of a script and corresponding p-code that is generated by the interpreter of the present invention. The script including the loop logic block 402 produces the output shown at 404. The executor of the present invention fetches the instructions shown at 406 from the p-code 407 generated by the p-code generator of the present invention. The p-code 407 evaluates the "If" statement at index 0 and if true, jumps to the end. If the "If" statement at index 0 evaluates to false, the p-code in indices 1, 2 and 3 are executed. As described hereinabove, the expression evaluator of the present invention may be utilized to evaluate the IF expression.

While the invention has been particularly shown and described with respect to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A method of interpreting a code, comprising:

scanning a stream of characters;

converting the scanned stream of characters into a stream of tokens, if the stream of characters represent a start tag of a script;

if the stream of characters represent a start tag of a script, lexing, parsing, and executing one or more streams of characters following the start tag;

if the one or more streams of characters represent a control logic block, generating p-code associated with one or more streams of characters within the control logic block and executing the generated p-code; and repeating the lexing, parsing, and executing step and the generating p-code step until a token representing a stop tag of the script is detected.

2. The method of claim 1, further including:

dynamically replacing the stream of characters with associated dynamic content, if the stream of characters are determined to contain a symbol having dynamic content.

3. The method of claim 1, further including:

transmitting the scanned stream of characters to a standard output stream after the step of scanning a stream of characters in a code if the start tag is not detected.

4. A multiphase single pass interpreter tangibly embodied on a computer readable medium, comprising:

a lexical analyzer to receive a character stream and to convert the character stream into a token, if the stream of characters represent a start tag of a script;

a parser to receive one or more of the tokens from the lexical analyzer;

a p-code generator to receive the one or more of the parsed tokens to generate p-code associated with the one or more of the parsed tokens; and an executor to execute the generated p-code, wherein the lexical analyzer, the parser, the p-code generator, and the executor switch functioning phases during a single pass through a script.

5. The multiphase single pass interpreter as claimed in claim 4, further including a scanner that scans the character stream and replaces the character stream with associated dynamic content if it is determined that the character stream contains a symbol having dynamic content.

6. The multiphase single pass interpreter as claimed in claim 4, wherein the executor receives parsed tokens from the parser for immediate execution.

7. A method of interpreting a code, comprising:

scanning one or more characters of a code, in a scan phase;

if a script start tag is scanned, converting the scanned stream of characters into a stream of tokens, switching to a full parse phase to fully lexan, parse, and execute one or more instructions following the start tag;

if a conditional block is scanned following the start tag, switching to p-code generation phase to generate p-code for one or more instructions within the conditional block, and switching to p-code execution phase to execute the p-code.

8. The method of interpreting a code as claimed in claim 7, further including:

dynamically replacing the one or more characters with associated dynamic content, if it is determined that the one or more characters has dynamic content.

9. The method of interpreting a code as claimed in claim 7, further including:

transmitting the one or more scanned characters to a standard output stream.

10. A program storage device readable by machine, tangibly embodying a program of instructions executable by the machine to perform method steps of interpreting a code, comprising:

scanning a stream of characters;

converting the scanned stream of characters into a stream of tokens, if the stream of characters represent a start tag of a script;

if the stream of characters represent a start tag of a script, lexing, parsing, and executing one or more streams of characters following the start tag;

if the one or more streams of characters represent a control logic block, generating p-code associated with one or more streams of characters within the control logic block and executing the generated p-code; and repeating the lexing, parsing, and executing step and the generating p-code step until a token representing a stop tag of the script is detected.

11. The program storage device as claimed in claim 10, wherein the method steps further include:

dynamically replacing the stream of characters with associated dynamic content, if the stream of characters are determined to contain a symbol having dynamic content.

12. A program storage device readable by machine, tangibly embodying a program of instructions executable by the machine to perform method steps of interpreting a code, comprising:

scanning one or more characters from a code, in a scan phase;

if a script start tag is scanned, converting the scanned stream of characters into a stream of tokens, switching to a full parse phase to fully scan, parse, and execute one or more instructions following the start tag;

if a conditional block is scanned following the start tag, switching to a p-code generation phase to generate p-code for one or more instruction within the conditional block, and switching to a p-code execution phase to execute the p-code.

13. The program storage device as claimed in claim 12, wherein the method steps further include:

if a script stop tag is scanned, switching back to the scan phase.

14. The program storage device of claim 12, further including, if an end of file is detected:

switching to a termination phase;

releasing one or more resources; and flushing buffers.

15. The method of claim 2, wherein the stream of characters represent one or more script objects.

* * * * *